United States Patent
Benkley, III

(10) Patent No.: US 12,061,947 B2
(45) Date of Patent: Aug. 13, 2024

(54) LOAD MATCHING IN A SMART CARD

(71) Applicant: IDEX BIOMETRICS ASA, Oslo (NO)

(72) Inventor: Fred G. Benkley, III, Middleton, MA (US)

(73) Assignee: IDEX Biometrics ASA, Oslo (NO)

( * ) Notice: Subject to any disclaimer, the term of this patent is extended or adjusted under 35 U.S.C. 154(b) by 0 days.

(21) Appl. No.: 18/010,277

(22) PCT Filed: Jun. 22, 2021

(86) PCT No.: PCT/EP2021/066961
§ 371 (c)(1),
(2) Date: Dec. 14, 2022

(87) PCT Pub. No.: WO2022/002691
PCT Pub. Date: Jan. 6, 2022

(65) Prior Publication Data
US 2023/0316034 A1      Oct. 5, 2023

Related U.S. Application Data

(60) Provisional application No. 63/045,615, filed on Jun. 29, 2020.

(51) Int. Cl.
*G06K 19/077*    (2006.01)

(52) U.S. Cl.
CPC .............................. *G06K 19/07777* (2013.01)

(58) Field of Classification Search
CPC ....... G06K 19/07777; G06K 19/07749; G06K 19/0709; G06K 19/0718
See application file for complete search history.

(56) References Cited

U.S. PATENT DOCUMENTS

| | | |
|---|---|---|
| 2005/0122211 A1 | 6/2005 | Yoshigi et al. |
| 2018/0330216 A1 | 11/2018 | Wendling et al. |
| 2020/0051061 A1* | 2/2020 | Gandolfo ................ G07F 7/084 |

FOREIGN PATENT DOCUMENTS

WO    2020016615 A1    1/2020

OTHER PUBLICATIONS

M. Gebhart, T. Baier and M. Facchini, "Automated antenna impedance adjustment for Near Field Communication (NFC)," Proceedings of the 12th International Conference on Telecommunications, Zagreb, Croatia, 2013, pp. 235-242. (Year: 2013).*

(Continued)

*Primary Examiner* — Matthew Mikels
(74) *Attorney, Agent, or Firm* — Smith Tempel Blaha LLC; Michael J. Tempel

(57) ABSTRACT

A smart card inlay comprising an inductive antenna, and a capacitive network. The inductive antenna is configured to (i) communicate wirelessly with a card terminal, and (ii) power the card circuitry via inductive coupling to the card terminal. The capacitive network is connected in parallel with the inductive antenna. The capacitive network comprises a first capacitor in series with a second capacitor. The second capacitor is connectable in parallel with card circuitry. The first capacitor has a capacitance $C_1$ and the second capacitor has a capacitance $C_2$, the ratio $C_2/C_1$ being so as to match the impedance of the card terminal as reduced by the capacitive network to the impedance of the card circuitry.

17 Claims, 6 Drawing Sheets

(56) References Cited

OTHER PUBLICATIONS

International Search Report and Written Opinion—PCT/EP2021/066961—ISA/EPO—Sep. 28, 2021.

* cited by examiner

LOAD MATCHING IN A SMART CARD

BACKGROUND

This disclosure relates to powering circuitry on a smart card. The circuitry may have, for example, biometric functionality.

A smart card refers to a device that includes an embedded integrated circuit chip and internal memory. The internal memory may be located on the integrated circuit chip, or be a separate chip embedded within the card. Smart cards exist in a wide variety of form factors, including plastic cards, key fobs, watches, wearables, electronic passports and USB-based tokens and subscriber identification modules (SIMS) used in mobile phones.

A smart card can be a contact card, a contactless card, or capable of operating as a contact and a contactless card. A contactless card communicates with a card terminal without direct physical contact. Typically, a contactless card communicates with a card terminal via radio waves. The contactless card may include an antenna to receive an electromagnetic signal, such as an RF signal, emitted from the card terminal. Likewise, data from the card can be communicated back to the card terminal by means of the card's antenna. The contactless card is powered by harvesting power from the RF signal.

FIG. 1 illustrates circuitry for transferring power from a card terminal 101 to a typical contactless smart card 102. Near Field Communication (NFC) driver source 103 generates a driving signal which is transmitted wirelessly to smart card 102 via inductive coupling of inductive antenna 104 of card terminal 101 to inductive antenna 105 of smart card 102. Capacitor 106 in parallel with inductive antenna 105 act as a power coupling circuit to couple power to the card circuitry 107. The values of the inductance $L_2$ and capacitance Clare chosen at manufacture such that the resonant frequency of the power coupling circuit is tuned to match that of the driving signal. The resonant frequency of the power coupling circuit, $f_r$, is given by:

$$f_r = 1/2\pi\sqrt{L_2 C_1} \qquad \text{(equation 1)}$$

It is desirable for contactless smart cards to satisfy the requirements laid out in the industry standard for contactless integrated circuit cards ISO/IEC 14443. The ISO/IEC 14443 standard specifies the carrier frequency of the RF driving signal sent from the card terminal to be 13.56 MHz. The ISO/IEC 14443 standard also requires that a contactless smart card should function properly when placed within a defined operating volume. The operating volume is a 3D space defined between the contactless smart card and the so-called "landing plane" of the card terminal. The landing plane is the area of the card terminal which a contactless card needs to be brought proximal to enable the card terminal to communicate wirelessly with the card. A logo is typically located on the landing plane to identify it as such to the user.

Early generation smart cards had limited on-card functionality, typically just RFID circuitry. The power requirements of this on-card circuitry were relatively low. As smart card technology has developed, the on-card circuitry has been called on to implement increasingly varied and complex functionality. For example, it is known to incorporate a biometric sensor in a smart card for the purpose of identifying a user of the smart card, and for another action such as a payment to be authorised on the basis of the user's identity being verified. Incorporating further functionality such as this in the card circuitry on the smart card has led to increased power requirements by the card circuitry.

All the energy required to power the functionality of the card circuitry must be derived from the driving signal received from the card terminal, which remains at the frequency of 13.56 MHz specified by the ISO/IEC 14443 standard. In order to derive sufficient power from the card terminal to operate those smart cards having more complex functionality, the user typically has to bring the smart card closer to the landing plane of the card terminal. Typically, the user needs to bring the smart card within 2 cm of the landing plane of the card terminal and maintain the smart card within that range for the duration of the transaction. In some cases, contact between the smart card and the landing plane of the card terminal is required to operate the functionality of the smart card. This impacts the usability of the smart card. It is desirable to increase the usability of contactless smart cards by enabling them to operate when held at a greater distance from the landing plane of the card terminal.

SUMMARY OF THE INVENTION

According to a first aspect, there is provided a smart card inlay comprising: an inductive antenna configured to (i) communicate wirelessly with a card terminal, and (ii) power card circuitry via inductive coupling to the card terminal; and a capacitive network connected in parallel with the inductive antenna, the capacitive network comprising a first capacitor in series with a second capacitor, the second capacitor connectable in parallel with card circuitry; wherein the first capacitor has a capacitance $C_1$ and the second capacitor has a capacitance $C_2$, the ratio $C_2/C_1$ being so as to match the impedance of the card terminal as reduced by the capacitive network to the impedance of the card circuitry.

The inductive antenna and capacitive network may form a power coupling circuit, the power coupling circuit having a resonant frequency which matches the card terminal's driving signal resonant frequency.

The card terminal's driving signal resonant frequency may be specified by the contactless integrated circuit card specification ISO/IEC 14443.

The first and second capacitors may be fixed capacitors.

The smart card inlay may further comprise the card circuitry, wherein the card circuitry is configured to communicate wirelessly with the card terminal via the inductive antenna.

The smart card inlay may further comprise a separate electrical connection from the card circuitry to the inductive antenna configured to transmit a modulated communication signal from the card circuitry to the inductive antenna, the separate electrical connection connecting the card circuitry to a point between the first capacitor and the inductive antenna, thereby enabling the modulated communication signal to be sent from the card circuitry to the inductive antenna bypassing the capacitive network.

The card circuitry may comprise a biometric sensor configured to sense biometric data of a user.

The card circuitry may further comprise a biometric processor configured to perform a biometric verification process to verify the identity of the user from the sensed biometric data.

The smart card inlay may further comprise: a further capacitive network connected in parallel with the inductive antenna, the further capacitive network comprising a third capacitor in series with a fourth capacitor, the fourth capacitor connectable in parallel with further card circuitry; wherein the third capacitor has a capacitance $C_3$ and the fourth capacitor has a capacitance $C_4$, the ratio $C_4/C_3$ being so as to match the impedance of the card terminal as reduced by the further capacitive network to the impedance of the further card circuitry.

The impedance of the card circuitry may be different to the impedance of the further card circuitry, and the ratio $C_2/C_1$ is different to the ratio $C_4/C_3$.

The combination of the inductive antenna, the capacitive network and the further capacitive network may have a resonant frequency which matches the card terminal's driving signal resonant frequency.

The third and fourth capacitors may be fixed capacitors.

The card circuitry may be configured to communicate wirelessly with the card terminal via the inductive antenna.

The further card circuitry may comprise a biometric sensor configured to sense biometric data of a user.

The further card circuitry may further comprise a biometric processor configured to perform a biometric verification process to verify the identity of the user from the sensed biometric data.

The smart card inlay may drive a different current to the card circuitry from between the first capacitor and the second capacitor than to the further card circuitry from between the third capacitor and the fourth capacitor.

The smart card inlay may drive a lower current to the card circuitry from between the first capacitor and the second capacitor than to the further card circuitry from between the third capacitor and the fourth capacitor.

The smart card inlay may further comprise a separate electrical connection from the card circuitry to the inductive antenna configured to transmit a modulated communication signal from the card circuitry to the inductive antenna, the separate electrical connection connecting the card circuitry to a point between the first capacitor and the inductive antenna, thereby enabling the modulated communication signal to be sent from the card circuitry to the inductive antenna bypassing the capacitive network.

The smart card inlay may comprise a plurality of inlay segments, the inductive antenna and capacitive network being distributed across the plurality of inlay segments.

According to another aspect, there is provided a smart card comprising the smart card inlay.

According to another aspect, there is provided a smart card comprising: card circuitry; and the smart card inlay.

According to another aspect, there is provided a smart card comprising: card circuitry; further card circuitry; and the smart card inlay.

BRIEF DESCRIPTION OF THE DRAWINGS

The present disclosure will now be described by way of example with reference to the accompanying drawings. In the drawings.

DETAILED DESCRIPTION

Figure 1:
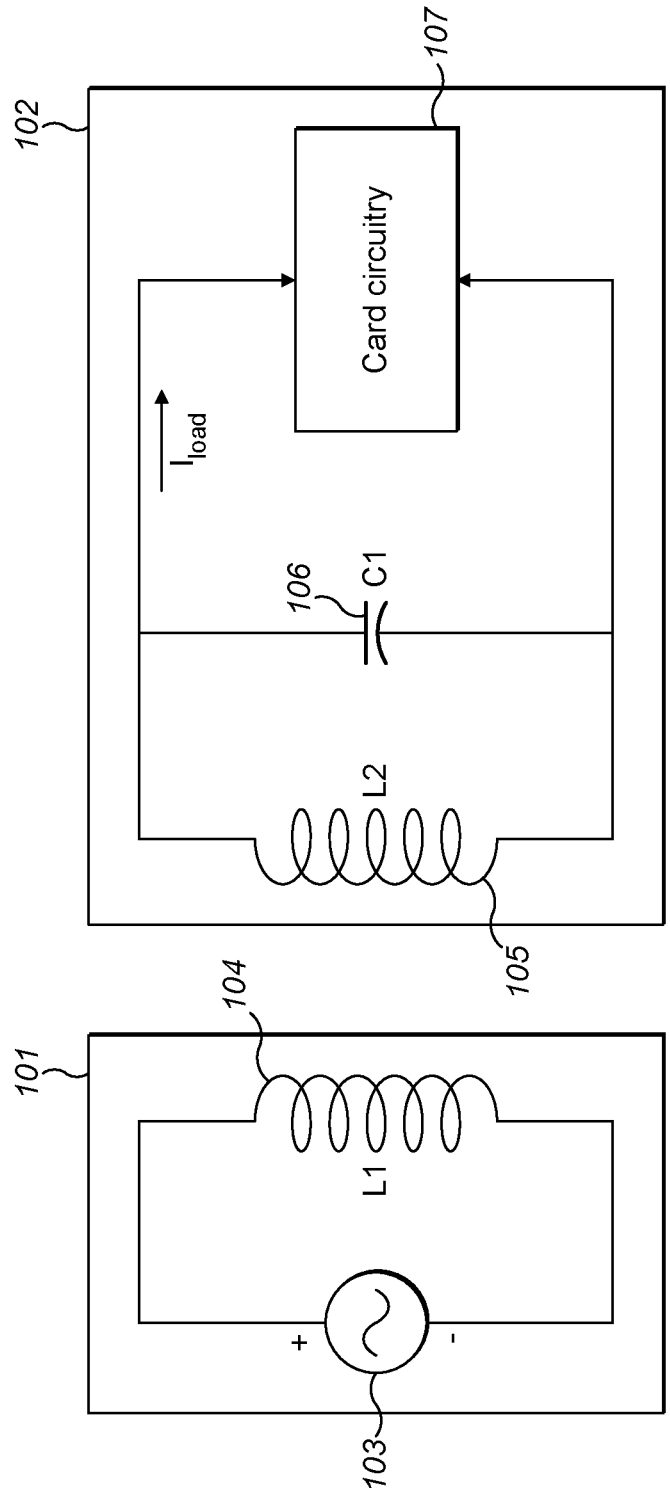
FIG. 1 illustrates circuitry for transferring power from a card terminal to a typical contactless smart card.

The following description relates to contactless smart cards and "dual-interface" smart cards. Dual-interface smart cards are those which are capable of communicating with a card terminal both in a contact mode via a physical communication interface, and in a contactless mode via a contactless communication interface. The following description applies to dual interface cards when they are operating in a contactless mode.

As will be described in the following, the circuitry of the smart cards described herein enable increased usability of the smart card by enabling the smart card to operate when held at a greater distance from the landing plane of the card terminal compared to the smart cards described in the background section. This is achieved by improving the transmission of power from the card terminal to the card circuitry of the smart card, which thereby enables sufficient power to be available to operate the card circuitry when the smart card is held further from the card terminal. The improvement in power transmission to the card circuitry is achieved by utilising one or more power coupling circuits on the smart card which cause the impedance of the card terminal as reduced by the power coupling circuit to be matched to the impedance of the card circuitry.

The following description refers to a smart card interacting with a card terminal. The smart card may have any one of several form factors, including a plastic card, a key fob, a dongle, a security token (e.g. a USB token), an electronic passport, or a subscriber identification module (SIM) used in a mobile phone. The smart card could be implemented within a device integrated into a communication device such as a mobile phone or smartphone. The smart card could be a wearable device, such as a bracelet, a watch, a glove/pair of gloves, a pin (e.g. a brooch), or a badge. The card terminal may, for example, be a card reader, an ATM, or a point of sale terminal.

The smart card may have a card body which is the same size and shape as a conventional smart card. Alternatively, the card body may have a different size and/or shape as a conventional smart card. The card may be cuboid in shape, with one dimension substantially less than both the others, for example less than 10% of either of the other dimensions. The thickness of the card may be between 0.5 mm and 2.0 mm. The card may satisfy the physical dimensions set out in the ISO 7810 standard for an ID-1 card.

Contactless smart cards or dual-interface smart cards operating in a contactless mode harvest power from the RF field at their antenna whilst the antenna receives communications from the card terminal. The power coupling circuit of FIG. 1 was designed to transfer power to card circuitry (such as RFID circuitry) which had much lower power requirements than what was available to be harvested from the RF communications from the card terminal. Because of this, the efficiency of the power transfer to the card circuitry was not a concern. However, the power coupling circuit of FIG. 1 continues to be used, even with more complex card circuitry with higher power requirements.

Referring to FIG. 1, the inductance $L_2$ of inductive antenna 105 and the capacitance $C_1$ of capacitor 106 are both fixed and set at manufacture, such that their resonant frequency when connected as shown in FIG. 1 matches that of the driver source 103. There is little design freedom in the inductance $L_2$. The inductance $L_2$ is chosen to cause the inductive antenna 105 to form a resonant transformer with the inductive antenna 104. Thus, for example, in a card, the antenna is typically two or three windings embedded in the plastic layers of the card around the periphery of the card. Referring to equation 1, since the resonant frequency of the power coupling circuit is fixed, and the inductance $L_2$ is generally fixed, it follows that the capacitance $C_1$ is also fixed. Thus, the values of $L_2$ and $C_1$ are constant regardless of the load current to the card circuitry 107.

The impedance of the card terminal (i.e. the driver source 103 and inductive antenna 104) is high. For example, the internal resistance of the card terminal may be of the order of a few k$\Omega$. By contrast, the impedance of the card circuitry 107 is low. For example, the internal resistance of the card circuitry may be a few hundred a Because of the disparity in impedance between the card terminal and the card circuitry, signal reflection is high, and hence power transfer from the card terminal to the card circuitry is poor. Whilst power requirements of the card circuitry were low, this poor power transfer was not problematic. However, power requirements of the card circuitry are higher with more functionality being integrated into the card circuitry.

Figure 2:
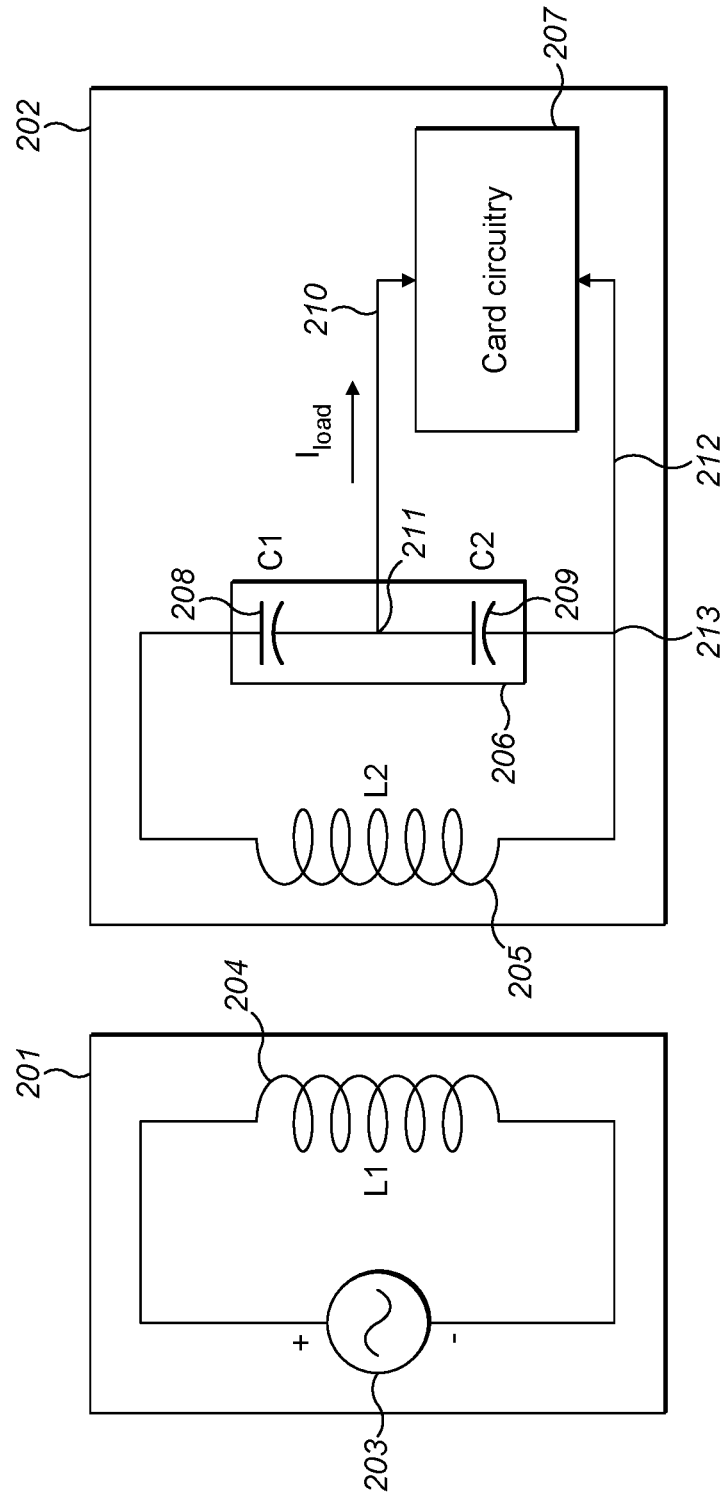
FIG. 2 illustrates circuitry for transferring power from a card terminal to a smart card with an impedance matching power coupling circuit.

FIG. 2 illustrates circuitry for transferring power from a card terminal 201 to a smart card 202 which has a power coupling circuit that causes the impedance of the card terminal as reduced by the power coupling circuit to be matched to the impedance of the card circuitry 207. The card terminal 201 is the same as described with reference to FIG. 1. Specifically, NFC driver source 203 generates a driving signal which is transmitted wirelessly to smart card 202 via inductive coupling of inductive antenna 204 of card terminal 201 to inductive antenna 205 of smart card 202. Antenna 205 of smart card 202 may comprise one, two, three or more coils of conductive material. The antenna may be a wire antenna. Alternatively, the antenna may be a printed antenna.

The smart card comprises a capacitive network 206 connected in parallel with the inductive antenna 205. The capacitive network 206 comprises a first capacitor 208 and a second capacitor 209 connected in series. A signal line 210 is connected to the capacitive network 206 at a point 211 between the first capacitor 208 and second capacitor 209. This signal line 210 is connected to card circuitry 207. A signal line 212 is connected to a point between the second capacitor 209 and the inductive antenna 205. This signal line 212 is connected to card circuitry 207. Thus, card circuitry 207 is connected in parallel with the second capacitor 209. Capacitors 208 and 209 in parallel with inductive antenna 205 act as a power coupling circuit to couple power to the card circuitry 207. The inductor has an inductance $L_2$. The first capacitor has a capacitance $C_1$. The second capacitor has a capacitance $C_2$. Both the first capacitor and second capacitor may be fixed capacitors. Their capacitance values are selected at manufacture. The values of the inductance $L_2$, the capacitance $C_1$ and the capacitance $C_2$ are chosen at manufacture such that the resonant frequency of the power coupling circuit is tuned to match that of the driving signal. The driving signal's centre frequency is specified by the standard ISO/IEC 14443. This is currently 13.56 MHz. The resonant frequency of the power coupling circuit, $f_r$, is given by:

$$f_r = 1/2\pi \sqrt{L_2 \left( \frac{C_1 C_2}{(C_1 + C_2)} \right)} \quad \text{(equation 2)}$$

As explained above, there is little design freedom in the inductance $L_2$. However, there is design freedom in the values of $C_1$ and $C_2$, subject to the resonant frequency $f_r$ being tuned to the centre frequency of the driving signal from the card terminal 201.

The capacitors 208 and 209 act to capacitively divide the load current to the card circuitry 207 on tap output 210. The values of $C_1$ and $C_2$ are chosen such that the ratio $C_2/C_1$ causes the impedance of the card terminal as moderated by the capacitive network to be matched to the impedance of the card circuitry. In other words, the capacitive network acts as an impedance divider. Specifically:

$$Z_{card\ circuitry} = \left( \frac{C_1}{C_1 + C_2} \right)^2 Z_{terminal} \quad \text{(equation 3)}$$

or, rearranged:

$$Z_{terminal} = \left( 1 + \frac{C_2}{C_1} \right)^2 Z_{card\ circuitry} \quad \text{(equation 4)}$$

where $Z_{terminal}$ is the impedance of the card terminal, and $Z_{card\ circuitry}$ is the impedance of the card circuitry 207.

The number of turns $N_2$ in the inductive antenna 205 relative to the number of turns $N_1$ in the inductive antenna 204 also impacts the impedance matching. Specifically:

$$\frac{Z_{terminal}}{Z_{card}} = \left( \frac{N_2}{N_1} \right)^2 \quad \text{(equation 5)}$$

where $Z_{terminal}$ is the impedance of the card terminal, and $Z_{card}$ is the impedance of the card 202 as a whole including the card circuitry 207, the inductive antenna 205 and the capacitive network 206. Equations 3 and 4 apply when the two inductors 204 and 205 have the same number of turns. In other words, $N_1 = N_2$. In this scenario, the inductance of the card terminal is matched to the inductance of the card, which maximises the efficiency of the power transfer from the card terminal to the smart card as a whole.

The card circuitry 207 communicates wirelessly with the card terminal 201 via the inductive antenna 205. The card circuitry 207 may convey data via amplitude modulation of the carrier signal as defined in the ISO/IEC 14443 standard. Specifically, the card circuitry may modulate the amplitude of the signal inductively coupled to the card terminal by load modulation. The card circuitry may switch a load in and out of the circuit shown in FIG. 2. This causes the voltage of the signal which is coupled to the card terminal to collapse and expand. This modulation of the voltage is detected by the card terminal and interpreted as data in accordance with the ISO/IEC 14443 standard. Typically, 5-10% of the signal is modulated in this way.

In the circuit of FIG. 2, the proportion of the load modulation at the card circuitry 207 which is inductively coupled to the inductor 204 of the card terminal by the inductor 205 of the smart card is reduced by the capacitive network, by a factor of $$\left(\frac{C_1}{C_1+C_2}\right).$$

Thus, in order to generate a current modulation at the inductive antenna 205 of X, the card circuitry 207 generates a current modulation of $$\left(\frac{C_1+C_2}{C_1}\right)X.$$

An example of the ratio $C_1/C_2$ is 4. In this example, the card circuitry would need to multiply the modulation by a factor of 1.25. This requires additional power.

Figure 3:
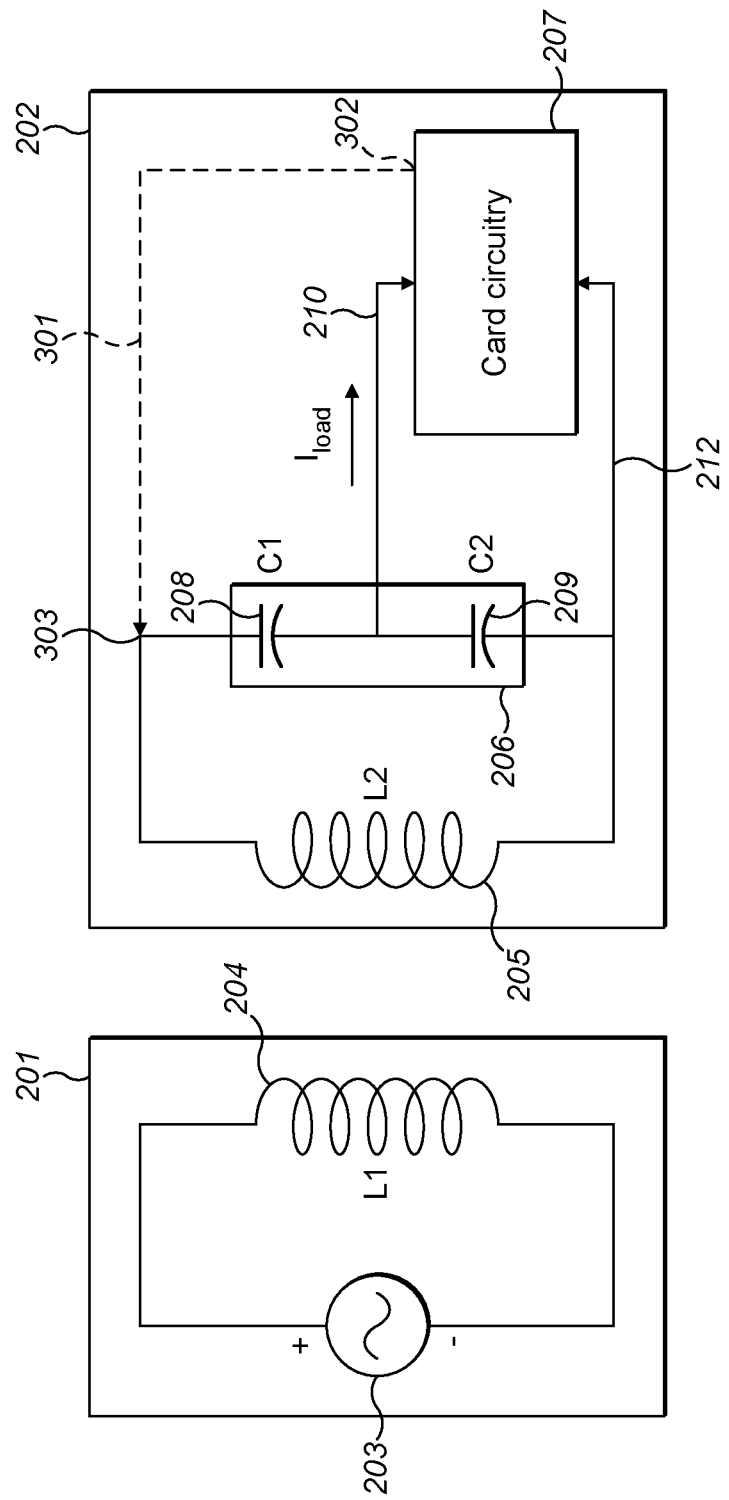
FIG. 3 illustrates the smart card of FIG. 2 modified by having a dedicated separate electrical connection from the card circuitry to the smart card antenna for modulating a communication signal.

FIG. 3 illustrates a modification to the circuitry of the smart card of FIG. 2. FIG. 3 is the same as FIG. 2 except that there is a dedicated separate electrical connection 301 from the card circuitry 207 to the inductive antenna 205. This dedicated separate electrical connection 301 meets the card circuitry at point 302, and meets the power coupling circuit at a point 303 between the first capacitor 208 and the inductive antenna 205. For example, dedicated separate electrical connection 301 may be connected to a separate pin 302 on card circuitry 207 compared to the power pin(s) on card circuitry 207 to which signal lines 210 and 212 to/from the capacitive network 206 are connected. The card circuitry communicates wirelessly with the card terminal via load modulation as described above. However, in the example of FIG. 3, the modulated current is transmitted to the inductive antenna 205 via the signal line 301. Thus, signal line 301 acts as a floating current source which is modulated by the card circuitry 207. This bypasses the capacitive network, and hence bypasses the capacitive dividing of the capacitive network. Thus (ignoring minor signal losses on the smart card), in order to generate a current modulation at the inductive antenna 205 of X, the card circuitry 207 generates a current modulation of X. Thus, the dedicated separate electrical connection 301 enables the card circuitry 207 to communicate with the card terminal 201 via signal modulation using less power than the circuit shown in FIG. 2.

The card circuitry 207 of the smart cards described with reference to FIGS. 2 and 3 comprises circuitry for performing the primary function of the card of communicating and transferring data with the card terminal 201 as specified in the ISO/IEC 14443 standard. The communication circuitry comprises a processor and a memory. The memory stores in a non-transitory manner code that is executable by the processor to perform logic functions of the primary function. Example implementations of this primary function are: performing financial transactions, providing physical access of the card user to a region of an environment (e.g. building access), identifying or authenticating a user, or retrieval of personal user information (e.g. medical information and records). This communication circuitry for performing the primary function of the card may be an embedded chip, for example an IC chip. It may be implemented as a single integrated circuit. It may be a so-called Secure Element.

The card circuitry 207 may additionally include circuitry for performing a secondary function. For example, the card circuitry 207 may include circuitry having biometric functionality. The biometric functionality may conveniently be implemented on a single integrated circuit. Suitably, the biometric circuitry comprises a biometric controller having a processor and a memory. The memory has a region which stores in a non-transitory manner code that is executable by the processor to perform logic functions of the biometric circuitry. The memory may also have a region which stores biometric validation data.

The biometric circuitry comprises a biometric sensor for sensing biometric data of a user. The nature of the biometric sensor will depend on the type of biometric data that is to be used. Some examples are: a fingerprint sensor for capturing fingerprints; a camera for capturing facial images, retina images or iris images; a vein pattern sensor for capturing vein patterns; a microphone for capturing voice patterns; or an accelerometer for capturing movement data. The biometric circuitry may include multiple sensors for capturing multiple types of biometric data, or for capturing multiple instances of biometric data of the same type: for example for capturing fingerprints on both sides of the card simultaneously.

The biometric validation data represents reference biometric data for an authorised user of the card. Alternatively, such biometric validation data may be stored in the communication circuitry. Biometric data captured by the biometric sensor is used in a biometric recognition or authentication process. In such a process, the biometric data is compared with the validation data to assess whether it is representative of the authorised user, for example by one of the following processes: fingerprint recognition; iris recognition; vein recognition; retina recognition; voice recognition; behavioural recognition; facial recognition, etc. That comparison may be done in the biometric circuitry, e.g. by the processor. Alternatively, or in addition, that comparison may be done by a processor in the communication circuitry.

The biometric circuitry may be separate (logically and/or physically) from the communication circuitry. For example, the biometric circuitry and communication circuitry may be distinct components (such as separate IC chips) each embedded within the card.

The card circuitry may have a different secondary function. For example, the card circuitry may include circuitry having one of more of: display functionality, keypad functionality, audio functionality, and location functionality for example using a GPS chip etc.

The primary and secondary functions may interact. Taking the example of communication circuitry and biometric circuitry, some communications to the card terminal may be withheld until the identity of the user has been verified via the biometric data sensed by the biometric sensor. Some or all of the biometric verification process may occur in the communication circuitry using biometric data received from the biometric circuitry.

All of the card circuitry 207 is powered by the card terminal 201 via inductive coupling of the inductive antennas 204, 205.

When the card circuitry 207 has first componentry for implementing a primary function and second componentry for implementing a secondary function, the power requirements of the first and second componentry may differ significantly. The second componentry may require significantly more power than the first componentry, or vice versa. For example, a biometric sensor requires significantly more power to operate than communication circuitry. The temporal power requirements of the first and second componentry may differ. For example, at a given time, the first and second components may be both operating, or one may be in a low power mode whilst the other is operating normally.

Figure 4:
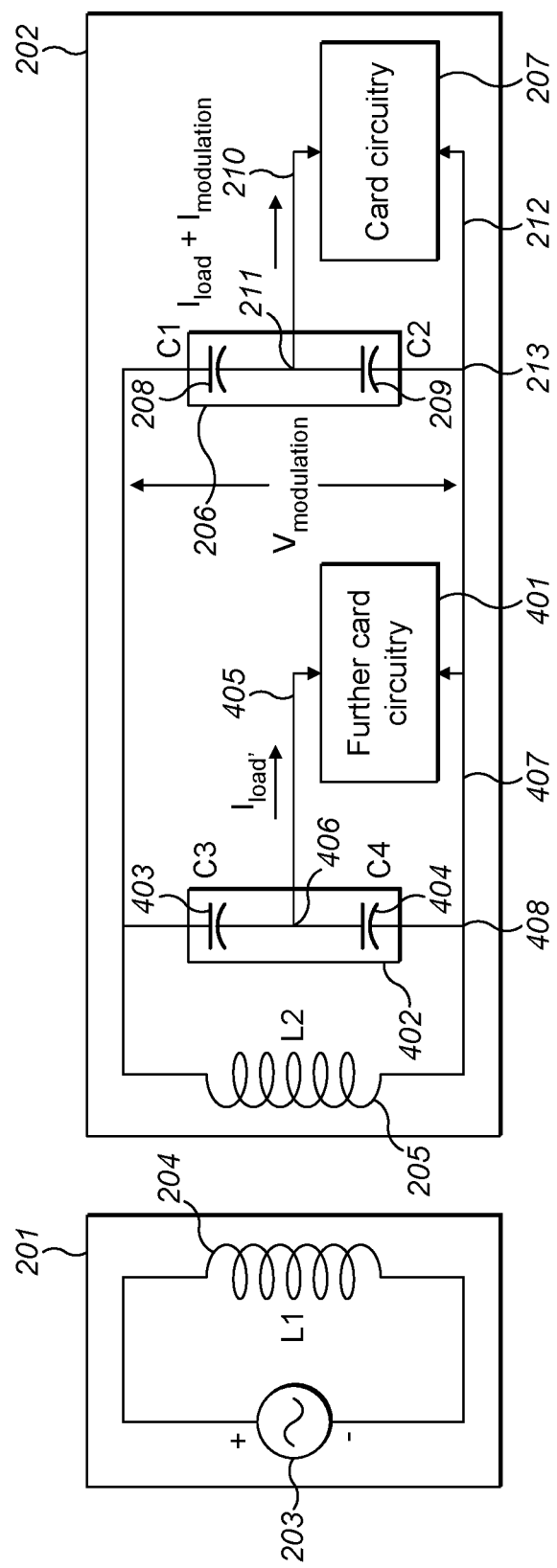
FIG. 4 illustrates circuitry for transferring power from a card terminal to a smart card with two impedance matching power coupling circuits for different on-card circuitries.

FIG. 4 illustrates an example smart card which has: (i) card circuitry 207 for performing the primary function of the card of communicating and transferring data with the card terminal 201 as specified in the ISO/IEC 14443 standard; and (ii) further card circuitry 401 for performing a secondary function of the card. This secondary function may, for example, be one of those listed above. For example, the secondary function may be that of biometric verification, the further card circuitry comprising a biometric sensor, and a biometric controller with a processor and memory.

FIG. 4 illustrates circuitry for transferring power from a card terminal 201 to the card circuitry 207 of smart card 202 which has a power coupling circuit that causes the impedance of the card terminal as reduced by the power coupling circuit to be matched to the impedance of the card circuitry 207. FIG. 4 also illustrates circuitry for transferring power from the card terminal 201 to the further card circuitry 401 which has a further power coupling circuit that causes the impedance of the card terminal as reduced by the further power coupling circuit to be matched to the impedance of the further card circuitry. Thus, the smart card has two impedance matching power coupling circuits, one for the card circuitry 207 and the other for the further card circuitry 401.

The card terminal 201 is the same as described with reference to FIG. 2. The inductive antenna 205, capacitive network 206 and card circuitry 207 are as described above with reference to FIG. 2.

The further card circuitry 401 is connected to inductive antenna 205 via a further capacitive network 402. Further capacitive network 402 is connected in parallel with the inductive antenna 205. The further capacitive network 402 comprises a third capacitor 403 and a fourth capacitor 404 connected in series. A signal line 405 is connected to the further capacitive network 402 at a point 406 between the third capacitor 403 and the fourth capacitor 404. This signal line 405 is connected to further card circuitry 401. A signal line 407 is connected to a point 408 between the fourth capacitor 404 and the inductive antenna 205. This signal line 407 is connected to further card circuitry 401. Thus, further card circuitry 401 is connected in parallel with fourth capacitor 404.

Capacitors 403 and 404 in parallel with inductive antenna 205 act as a further power coupling circuit to couple power to the further card circuitry 401. The third capacitor 403 has a capacitance $C_3$. The fourth capacitor 404 has a capacitance $C_4$. Both the third capacitor and fourth capacitor may be fixed capacitors. Their capacitance values are selected at manufacture. The values of the inductance $L_2$ and capacitances $C_1$, $C_2$, $C_3$ and $C_4$ are chosen at manufacture such that the combination of the inductive antenna 205, the capacitive network 206, and the further capacitive network 402 has a resonant frequency which is tuned to match that of the driving signal. The driving signal's centre frequency is specified by the standard ISO/IEC 14443. This is currently 13.56 MHz. The resonant frequency, $f_r$, of the combination of the inductive antenna, the capacitive network and the further capacitive network is given by:

$$f_r = 1/2\pi \sqrt{L_2 \left( \frac{C_1 C_2}{(C_1 + C_2)} + \frac{C_3 C_4}{(C_3 + C_4)} \right)} \quad \text{(equation 6)}$$

The capacitors 403 and 404 act to capacitively divide the load current to the further card circuitry 401 on tap output 405. The values of $C_3$ and $C_4$ are chosen such that the ratio $C_3/C_4$ causes the impedance of the card terminal as moderated by the further capacitive network to be matched to the impedance of the further card circuitry. In other words, the further capacitive network acts as an impedance divider. Specifically:

$$Z_{terminal} = \frac{\left(\frac{C_3}{C_3+C_4}\right)^2 Z_{further\ card\ circuitry} * \left(\frac{C_1}{C_1+C_2}\right)^2 Z_{card\ circuitry}}{\left(\frac{C_3}{C_3+C_4}\right)^2 Z_{further\ card\ circuitry} + \left(\frac{C_1}{C_1+C_2}\right)^2 Z_{card\ circuitry}} \quad \text{(equation 7)}$$

where $Z_{terminal}$ is the impedance of the card terminal, and $Z_{further\ card\ circuitry}$ is the impedance of the further card circuitry 401.

Both the impedance of the card circuitry 207 and the impedance of the further card circuitry 401 are less than the impedance of the card terminal. However, the impedance of the card circuitry 207 may be different to the impedance of the further card circuitry 401. In this case, the ratio $C_2/C_1$ is different to the ratio $C_4/C_3$. This enables the impedance of the card terminal to be reduced by the capacitive network 206 to match the impedance of the card circuitry 207, and separately to be reduced by the further capacitive network 402 to match the impedance of the further card circuitry 401.

The operating current requirements of the card circuitry 207 and the further card circuitry 401 may be significantly different. Thus, the current tapped off the capacitive network 206 at point 211 to the card circuitry 207 (shown as $I_{LOAD}+I_{MODULATION}$ on FIG. 4) may be significantly different to the current tapped off the further capacitive network 402 at point 406 to the further card circuitry 401 (shown as 'LOAD' on FIG. 4).

For example, the further card circuitry 401 may have a higher operating current requirement than the card circuitry 207. This applies to the example in which the card circuitry 207 is communication circuitry for communicating wirelessly with the card terminal 201, and the further card circuitry is biometric circuitry for verifying the identity of a user (as described above). The biometric components generally draw more power than the communication circuitry. For example, in order to accommodate the differing current requirements, the ratio $C_2/C_1$ may be 2:1, whereas the ratio $C_4/C_3$ may be 4:1. Thus, by separating the coupling of power to the circuitry and the further circuitry, a separate current path is provided to each. This enables a lower current $I_{LOAD}+I_{MODULATION}$ to be applied to the communication circuitry than the current $I_{LOAD'}$ applied to the biometric circuitry. The voltage $V_{MODULATION}$ is therefore applied to the communication circuitry as set out in the ISO/IEC 14443 standard.

The further card circuitry 401 may have a lower operating current requirement than the card circuitry 207. Taking the example of a smart card which performs biometric verification in addition to communicating with a card terminal, the card circuitry 207 may be an integrated component which has: (i) circuitry for performing the primary function of the card of communicating and transferring data with the card terminal 201 as specified in the ISO/IEC 14443 standard, (ii) power management circuitry, and (iii) a biometric controller with a processor and memory for performing biometric verification. In this example, the further card circuitry comprises only a biometric sensor having the sensing elements and an ASIC. In this example, the further card circuitry may have a lower operating current requirement than the card circuitry.

Figure 5:
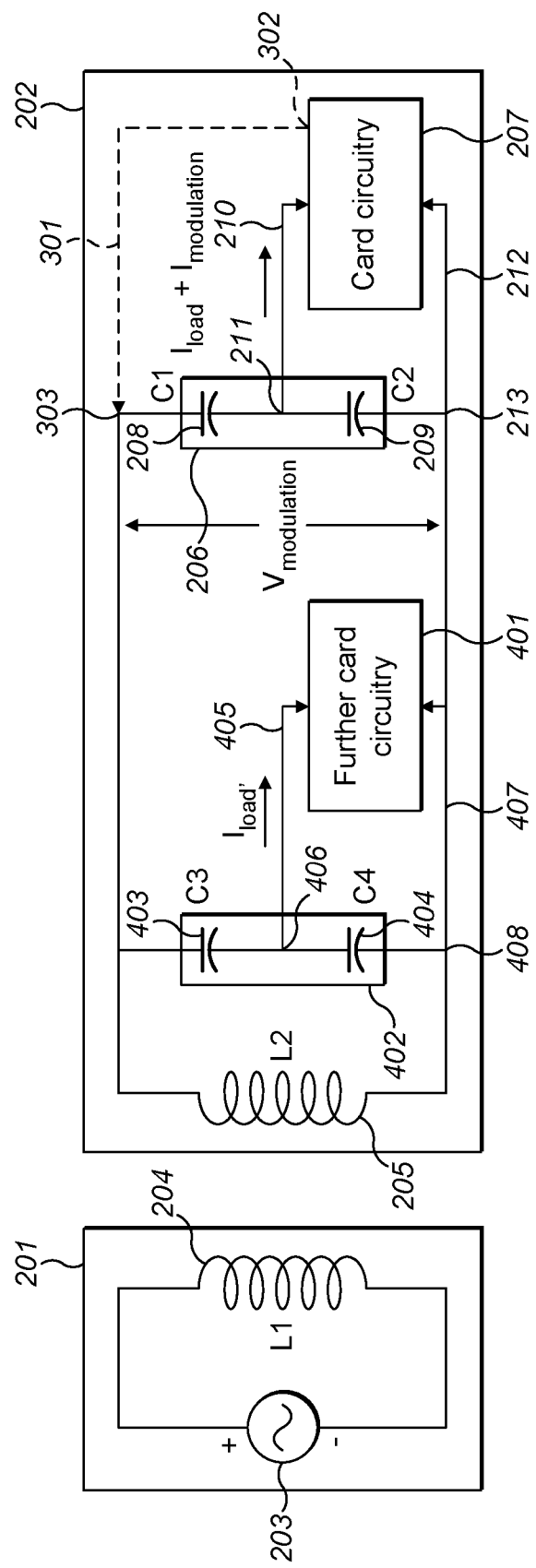
FIG. 5 illustrates the smart card of FIG. 4 modified by having a dedicated separate electrical connection from the card circuitry to the smart card antenna for modulating a communication signal.

The card circuitry 207 of FIG. 4 communicates wirelessly with the card terminal 201 via the inductive antenna 205 as described above with respect to FIG. 2. FIG. 5 illustrates a modification to the circuitry of the smart card of FIG. 4. This modification is the same as the one described with reference to FIG. 3. FIG. 5 is the same as FIG. 4 except that there is a dedicated separate electrical connection 301 from the card circuitry 207 to the inductive antenna 205. This dedicated separate electrical connection 301 is as described with reference to FIG. 3. Thus, the dedicated separate electrical connection 301 enables the card circuitry 207 to communicate with the card terminal 201 via signal modulation using less power than the circuit shown in FIG. 4.

FIGS. 2 and 3 illustrate a single power coupling circuit for impedance matching single card circuitry. FIGS. 4 and 5 illustrate two power coupling circuits, one for impedance matching card circuitry, and the other for impedance matching further card circuitry. The skilled person will appreciate that the same principle applies to impedance matching three or more separate card circuitries, with a further capacitive network being incorporated for each additional card circuitry.

There are many different types of card circuitry which may be incorporated onto the smart card. Even the same type of card circuitry, for example Secure Elements for providing the communication circuitry, differ in terms of their power requirements, for example due to differences in their memory and processing capabilities. Thus, the capacitance values $C_1$, $C_2$ (and optionally $C_3$, $C_4$) are specific to the card circuitry in question.

Figure 6:
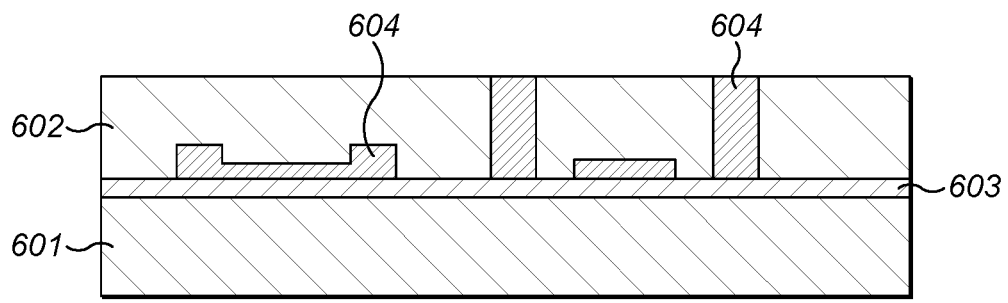
FIG. 6 illustrates a smart card comprising plastic layers sandwiching an inlay.

Each smart card described herein may have a layered structure. As shown in FIG. 6, this layered structure may comprise one or more lower layers of card material 601 (for example plastic) and one or more upper layers of card material 602 (for example plastic). The upper and lower layers of card material sandwich one or more inlays 603. In the case that there are a plurality of inlays 603, those inlays are electrically connected to each other. The circuitry components 604 described herein are distributed amongst the inlay(s) and/or the card material layers.

The inlay(s) has a size and shape which is less than or equal to a conventional smart card. For example, the inlay(s) has a size and shape that is less than the physical dimensions set out in the ISO 7810 standard for an ID-1 card. For example, the inlay(s) may have a thickness of 0.2-0.3 mm. The base of the inlay(s) may be composed of a flexible plastic such as PVC, PC, PET-T or Teslin®. Referring to the example of FIG. 2, the following circuitry components are mounted onto the inlay(s): inductive antenna 205, capacitive network 206, and signal lines 210 and 212. Referring to FIG. 3, the following circuitry components are mounted onto the inlay(s): inductive antenna 205, capacitive network 206, and signal lines 210, 212 and 301. Referring to FIG. 4, the following circuitry components are mounted onto the inlay(s): inductive antenna 205, capacitive network 206, further capacitive network 402, and signal lines 210, 212, 405 and 407. Referring to FIG. 5, the following circuitry components are mounted onto the inlay(s): inductive antenna 205, capacitive network 206, further capacitive network 402, and signal lines 210, 212, 405, 407 and 301.

These circuitry components are mounted onto the inlay(s) prior to sandwiching the inlay(s) between the plastic layers 601, 602. Once the inlay(s) has been arranged between the plastic layers 601, 602, a hot lamination process may then be used to fuse the inlay(s) between the plastic layers 601, 602. Hot lamination uses heat and pressure to cause the layers to bond together.

The card circuitry 207 may also be mounted onto the inlay(s) prior to sandwiching the inlay(s) between the plastic layers 601, 602. The further card circuitry 401 may also be mounted onto the inlay(s) prior to sandwiching the inlay(s) between the plastic layers 601, 602. In this case, the card circuitry 207 and further card circuitry 401 (if present) are present during the hot lamination process along with the other circuitry components. This is a suitable method for card circuitry 207 and further card circuitry 401 (if present) which are not damaged by heat and/or pressure.

Figure 7:
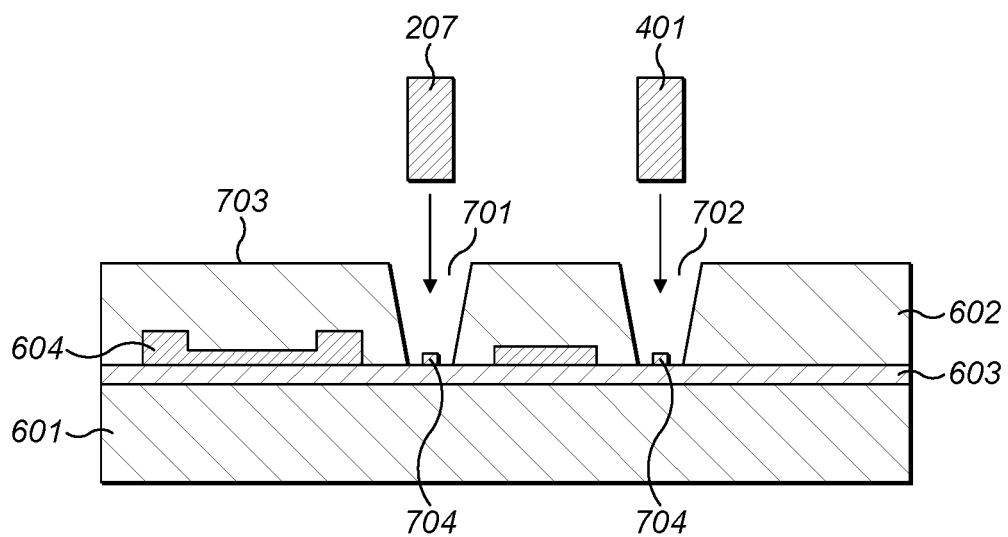
FIG. 7 illustrates a method of applying circuitry components to cavities in a pre-formed card.

Alternatively, one or more of the card circuitry 207 and further card circuitry 401 may not be mounted to the inlay(s) prior to the hot lamination process. Instead, the inlay(s) comprise only the circuitry components described above. Contact points for the card circuitry 207 and/or further card circuitry 401 are added to the inlay(s) at appropriate points for subsequent connection to the card circuitry 207 and/or further card circuitry 401. The inlay(s) are sandwiched between the plastic layers 601, 602, and a hot lamination process is used to bond the layers together. At this point, the card circuitry 207 and/or further card circuitry 401 are not part of the structure. Following the hot lamination process, one or more cavities 701, 702 are made in the upper surface of the card 703 which extend down to the contact points 704 on the inlay(s). The cavities may be formed by, for example, milling or etching. The card circuitry 207 and/or further card circuitry 401 is then placed into its cavity (as illustrated by the arrows in FIG. 7) and electrically connected to the contact points on the inlay(s), for example using conductive adhesive, wire bonds, copper pads etc. The electrical circuit on the inlay(s) is thereby completed. The card circuitry 207 and/or further card circuitry 401 may then be secured into the card, for example using adhesive and/or by applying a layer of sealant or card material between the top of the card circuitry 207 and/or further card circuitry 401 and the surface of the card 703. This is a suitable method for card circuitry 207 and/or further card circuitry 401 which are damaged by the heat and/or pressure applied during hot lamination.

In a further alternative, some component parts of the card circuitry 207 and/or further card circuitry 401 may be mounted to the inlay(s) prior to the hot lamination process, and other component parts added after hot lamination. For example, those components which are resistant to the heat and pressure applied during hot lamination may be mounted to the inlay(s) prior to hot lamination, whereas those components which may be damaged by the heat and/or pressure applied during hot lamination may be added to the card after the hot lamination process using the cavity method described above. In the example described herein in which the card circuitry has biometric functionality, the biometric controller (which is resistant to the heat and pressure of hot lamination) may be mounted to the inlay(s) prior to hot lamination, whereas the biometric sensor (which is sensitive to the heat and pressure of hot lamination) may be added to the card later. The biometric sensor is added in a cavity formed in the card, as described above.

Although hot lamination has been described above, other methods of fusing the plastic layers and inlay(s) together may be used. For example, a cold lamination process may be used.

The smart cards described herein increase the efficiency of the power transfer from the card terminal to the smart card circuitry by incorporating capacitive networks onto the smart card. The capacitors of these capacitive networks can be added to the flexible inlay in a smart card without impacting the ability to meet ISO dimensional requirements and requiring no disruption to the conventional smart card manufacturing process. No alteration to the card circuitry is required. No changes are required to the inductive antenna in the smart card. No alteration to the smart card terminals is required. No alteration to the card terminal is required.

By matching the impedances of the card terminal to the card circuitry as described herein, signal reflection is greatly reduced, and hence power transfer to the card circuitry is much more efficient. An increase in efficiency of up to 50% is achieved. This enables the smart card to derive sufficient power from the card terminal to operate the card circuitry when the smart card is held further from the landing plane of the card terminal. For a smart card that previously had to be held at 2 cm from the landing plane for it to be sufficiently powered, a 50% increase in power transfer efficiency means that it can be held at 4 cm from the landing plane and be sufficiently powered to operate. Thus, the circuitry described herein increases the usability of contactless smart cards and dual interface smart cards operating in a contactless mode.

In the examples given above, the term power is understood to refer to any relevant feature of energy availability. Examples include available energy, voltage, current and power or any combination thereof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A smart card inlay comprising:
   an inductive antenna configured to (i) communicate wirelessly with a card terminal, and (ii) power card circuitry via inductive coupling to the card terminal;
   a capacitive network connected in parallel with the inductive antenna, the capacitive network comprising a first capacitor in series with a second capacitor, the second capacitor connectable in parallel with card circuitry; and
   a further capacitive network connected in parallel with the inductive antenna, the further capacitive network comprising a third capacitor in series with a fourth capacitor, the fourth capacitor connectable in parallel with further card circuitry;
   wherein the first capacitor has a capacitance $C_1$ and the second capacitor has a capacitance $C_2$, the ratio $C_2/C_1$ being so as to match the impedance of the card terminal as reduced by the capacitive network to the impedance of the card circuitry;
   wherein the third capacitor has a capacitance $C_3$ and the fourth capacitor has a capacitance $C_4$, the ratio $C_4/C_3$ being so as to match the impedance of the card terminal as reduced by the further capacitive network to the impedance of the further card circuitry.

2. A smart card inlay as claimed in claim 1, wherein the inductive antenna and capacitive network form a power coupling circuit, the power coupling circuit having a resonant frequency which matches the card terminal's driving signal resonant frequency.

3. A smart card inlay as claimed in claim 2, wherein the card terminal's driving signal resonant frequency is specified by the contactless integrated circuit card specification ISO/IEC 14443.

4. A smart card inlay as claimed in claim 3, wherein the first and second capacitors are fixed capacitors.

5. A smart card inlay as claimed in claim 1, further comprising the card circuitry, wherein the card circuitry is configured to communicate wirelessly with the card terminal via the inductive antenna.

6. A smart card inlay as claimed in claim 5, further comprising a separate electrical connection from the card circuitry to the inductive antenna configured to transmit a modulated communication signal from the card circuitry to the inductive antenna, the separate electrical connection connecting the card circuitry to a point between the first capacitor and the inductive antenna, thereby enabling the modulated communication signal to be sent from the card circuitry to the inductive antenna bypassing the capacitive network.

7. A smart card inlay as claimed in claim 5, wherein the card circuitry comprises a biometric sensor configured to sense biometric data of a user.

8. A smart card inlay as claimed in claim 7, wherein the card circuitry further comprises a biometric processor configured to perform a biometric verification process to verify the identity of the user from the sensed biometric data.

9. A smart card inlay as claimed in claim 1, wherein the impedance of the card circuitry is different to the impedance of the further card circuitry, and the ratio $C_2/C_1$ is different to the ratio $C_4/C_3$.

10. A smart card inlay as claimed in claim 1, wherein the combination of the inductive antenna, the capacitive network and the further capacitive network has a resonant frequency which matches the card terminal's driving signal resonant frequency.

11. A smart card inlay as claimed in claim 1, wherein the third and fourth capacitors are fixed capacitors.

12. A smart card inlay as claimed in claim 1, further comprising the further card circuitry, wherein the further card circuitry comprises a biometric sensor configured to sense biometric data of a user.

13. A smart card inlay as claimed in claim 12, wherein the further card circuitry further comprises a biometric processor configured to perform a biometric verification process to verify the identity of the user from the sensed biometric data.

14. A smart card inlay as claimed in claim 1, configured to drive a different current to the card circuitry from between the first capacitor and the second capacitor than to the further card circuitry from between the third capacitor and the fourth capacitor.

15. A smart card inlay as claimed in claim 14, configured to drive a lower current to the card circuitry from between the first capacitor and the second capacitor than to the further card circuitry from between the third capacitor and the fourth capacitor.

16. A smart card inlay comprising:
    a plurality of inlay segments;
    an inductive antenna distributed across the plurality of inlay segments, the inductive antenna being configured to (i) communicate wirelessly with a card terminal, and (ii) power card circuitry via inductive coupling to the card terminal; and a capacitive network distributed across the plurality of inlay segments and connected in parallel with the inductive antenna, the capacitive network comprising a first capacitor in series with a second capacitor, the second capacitor connectable in parallel with card circuitry;

wherein the first capacitor has a capacitance $C_1$ and the second capacitor has a capacitance $C_2$, the ratio $C_2/C_1$ being so as to match the impedance of the card terminal as reduced by the capacitive network to the impedance of the card circuitry.

17. A smart card comprising the smart card inlay of claim 16.

* * * * *